(No Model.)  3 Sheets—Sheet 1.

E. F. STODDARD.
HORSE HAY RAKE.

No. 314,624.  Patented Mar. 31, 1885.

Attest:
Carl Spengel
E. W. Rector

Inventor
E. Fowler Stoddard
by Munn & Co.
his Att'ys.

(No Model.) 3 Sheets—Sheet 2.
E. F. STODDARD.
HORSE HAY RAKE.
No. 314,624. Patented Mar. 31, 1885.
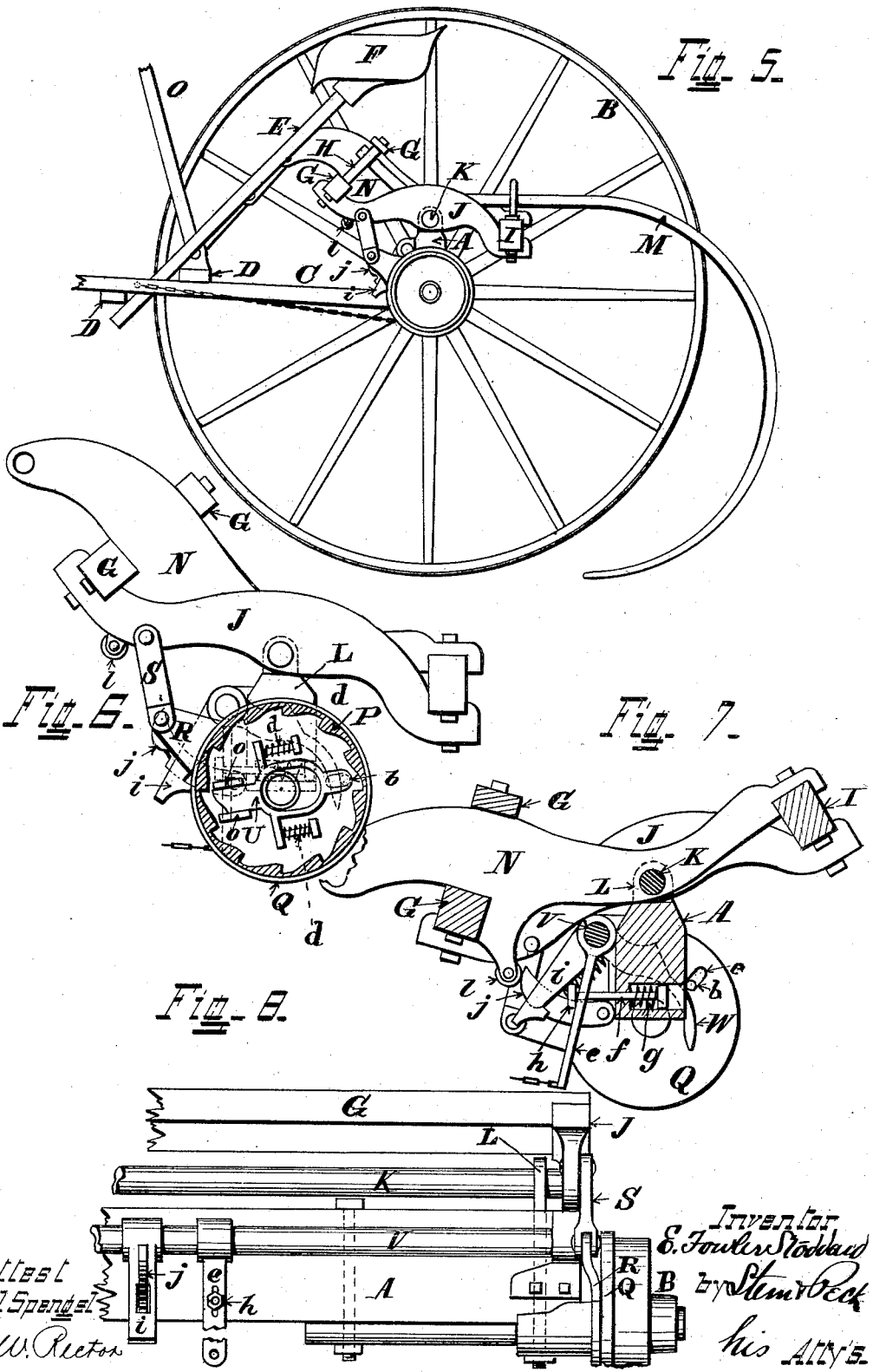
Attest
Carl Spengel
E. W. Rector
Inventor
E. Fowler Stoddard
by Stem & Peck
his Atty's

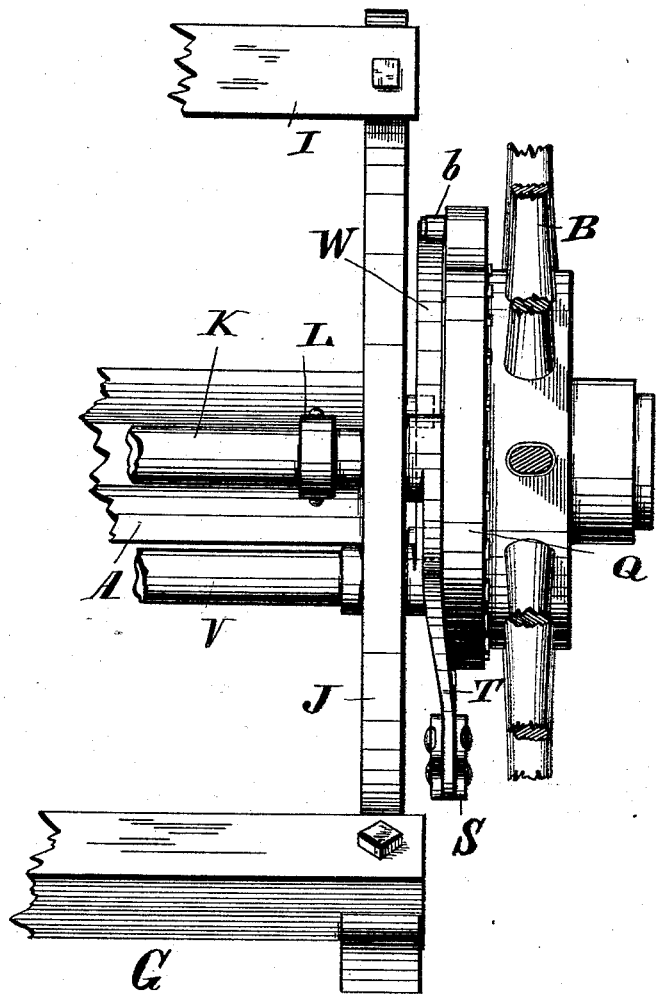

UNITED STATES PATENT OFFICE.

E. FOWLER STODDARD, OF DAYTON, OHIO, ASSIGNOR TO J. W. STODDARD & CO., OF SAME PLACE.

HORSE HAY-RAKE.

SPECIFICATION forming part of Letters Patent No. 314,624, dated March 31, 1885.

Application filed January 11, 1884. (No model.)

*To all whom it may concern:*

Be it known that I, E. FOWLER STODDARD, a citizen of the United States, residing at Dayton, in the county of Montgomery and State of Ohio, have invented certain new and useful Improvements in Horse Hay-Rakes, of which the following is a full, clear, and exact description, reference being had to the accompanying drawings, forming a part of this specification.

My invention relates to an improvement in horse hay-rakes of that class known as "self-dump" rakes, in which the traction of the wheels is employed, at the will of the operator, to elevate the teeth and discharge the collected load, and this while the machine is either going forward in a straight line or is in the act of turning in either direction.

It also relates more particularly to that class of rakes which have been long and favorably known to the trade as "Hollingsworth" rakes, which are merely hand-dump rakes, but which are chiefly distinguished from other rakes by and derive their principal merit from having the teeth attached to a rocking frame or rake-head consisting of two or more parallel bars supported upon arms pivoted to the axle, and with the teeth adjustably pivoted, so as to be capable of forward or backward adjustment to accommodate them to light or heavy raking, at a point between the bars of the rocking frame and in line with the oscillating axis of said rocking frame. The most desirable manner of attaching the teeth in this class of rakes is by means of thimbles mounted upon a rod or shaft just over the axle, which rod serves not only the purpose of a pivotal bearing for the teeth, but also for the arms of the rocking frame, which are journaled thereon.

The object of my present invention is to convert this rake into a self-dumping rake by means of simple and efficient devices; and the novelty consists in the construction and combination of the parts, as will be hereinafter set forth and specifically claimed.

Figure 1:
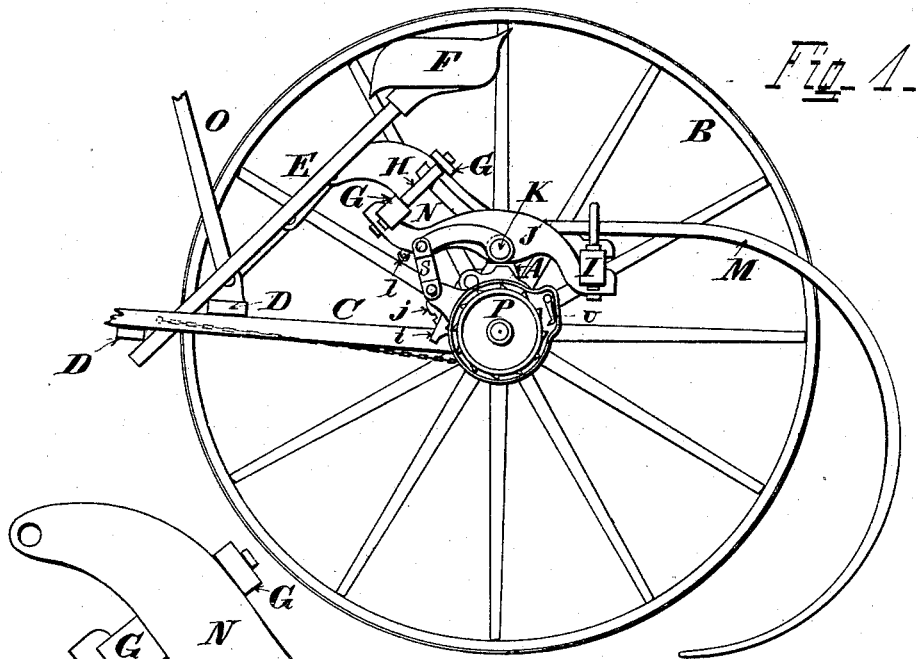
Figure 2:
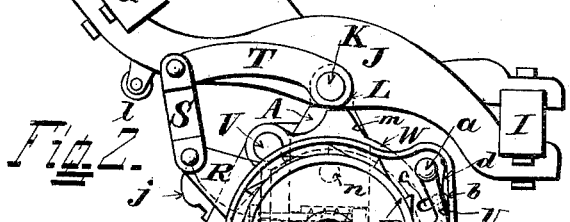
Figure 3:
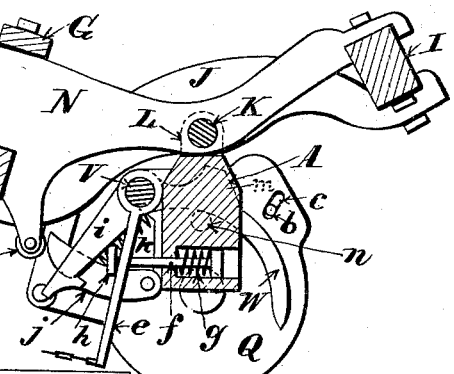
Figure 4:
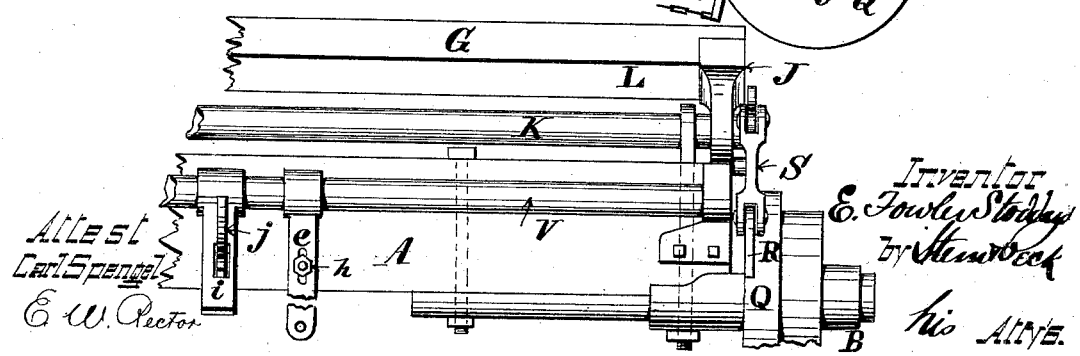

In the accompanying drawings, Figure 1 is a side elevation of a rake embodying my invention with one of the carrying-wheels removed, but retaining the hub of said wheel. Fig. 2 is an enlarged end elevation of the rake-head and connecting and operating parts in their respective positions when the teeth are down at work. Fig. 3 is a cross-section of the rake-head with the parts in the position when the teeth have been elevated. Fig. 4 is a front view of little more than half of the axle and rake-head, showing the relative positions of the parts thereto attached. Fig. 5 is a side elevation of a rake embodying a modification of my invention. Fig. 6 is an enlarged end elevation of the rake-head and operating parts, showing the modification in detail, with the parts in position when the teeth are down at work. Fig. 7 is a cross-section of the rake-head, axle, and operating parts in the position when the teeth are elevated and just about to be released. Fig. 8 is a front elevation of little more than half the rake-head, showing the relative positions of the parts embodying the modification. Fig. 9 is a plan view, enlarged, of one end of the rake-head, showing the cam-arm W and coacting parts.

The same letters of reference are used to indicate identical parts in all the figures.

A represents the axle, provided with spindles upon which the carrying-wheels B revolve. Secured to this axle are the customary thills, C, with cross-girts D, supporting the seat-beam E, to which is attached the driver's seat F.

The rocking frame or rake-head is composed of two front bars, G, between which are secured the spring-supports H for the forward ends of the rake-teeth, and a rear staple-bar, I, said bars being connected at their ends by the arms J, which are journaled at or near their middle on a shaft or rod, K, just above and extending the length of the axle, and which rod is itself supported in standards L, attached to and extending from the top of the axle.

The teeth M, of the shape shown, after being passed through the staples in the rear bar, are adjustably clamped in thimbles or eye-bearings, which are loosely strung upon the rod K in the usual or any suitable manner, and have their forward projecting ends supported by the usual or any suitable spring-guides, H, connected to the front bar or bars of the rocker-frame.

At or near the middle of the rocker-frame is secured the tilting-arm N, which, attached to both the front and rear bars of the rocker-frame, encompasses and is rigidly secured to the rod K by a key, pin, or other suitable fastening; and the usual hand-lever, O, is attached to the forward end of the lifting-arm N by suitable connecting-links.

This much of the rake constitutes the ordinary hand-dump rake of the Hollingsworth class.

Now, to render this rake a self-dump rake, in which the power of both the carrying-wheels is applied to the rocking frame at or near its middle, I employ the following instrumentalities:

Attached to or formed with the inner sides of the hubs of the carrying-wheels are ratchets P, which continually revolve with the carrying-wheels, and which ratchets, as shown in Figs. 1, 2, 3, and 4, are formed upon the outer face of the hub, or are external ratchets. These ratchets are covered by the casing-shields Q, which shields are journaled upon the spindles between the hubs and the ends of the axle A, and each consists, essentially, of a flat plate or disk, which I denominate a "pawl-carrier," with a rim encircling and projecting over the ratchets to guard them from dirt and hay, which might otherwise get caught and wrapped in them.

To the forward extensions, R, of the pawl-carriers Q are connected, by pivotal links S, the forward ends of crank-arms T, which are keyed or otherwise rigidly secured to the outer ends of the rod K.

Suitably pivoted in each casing Q at $a$ is a dog or pawl, U, Fig. 2, having a laterally-projecting stud, $b$, which extends through a slot, $c$, in the casing and projects therefrom. Any suitable spring, $d$, is employed to cause the dog to engage with the ratchets P at such times as it is desired to effect a lock between the rake-head and the carrying-wheels.

Extending along the front of the axle, in suitable bearings, is a rock-shaft, V, to the ends of which rearwardly-extending cam-arms W are rigidly fastened, which in their normal position bear against the studs $b$, to hold the dogs U out of engagement with the ratchets.

Keyed or otherwise fastened to the rock-shaft V at or near its middle is a pendent arm, $e$, from the lower end of which a chain or cord extends, and is attached to the seat beam or frame within ready access of the driver's foot.

Through a perforation or slot in the arm $e$ is passed the front end of a bolt, $f$, which extends back through the axle, which is counter-bored from its rear side, as shown particularly in Figs. 3 and 7, to receive a spiral spring, $g$, which encompassing the bolt, bears at its front against the front wall of the counterbore and at its rear against the head of the bolt, as shown. The tension of the spring may be adjusted by a nut, $h$, upon the front end of the bolt, bearing against the arm $e$, as will be readily understood.

The purpose of the spring-bolt just described is to hold the arm $e$ in such position that the cam-arms W will bear against the studs $b$, and hold the dogs out of engagement with the ratchets, as seen in Fig. 2, and also to retract the rock-shaft V and lift the dogs out of engagement to break the lock. Also keyed upon the rock-shaft V is a downwardly-projecting slotted arm, $i$, directly under the tilting arm N, through the slot in which arm $i$ passes the forwardly-projecting latch $j$, which is pivoted to the axle, as shown, has near its forward end a locking-notch on its under side, and is forced down by any suitable spring, $k$, interposed between it and the axle. The end or nose of the latch may be beveled or rounded, as shown, and the tilting arm N has an extension to which is preferably journaled a friction-roller, $l$, designed to come in contact with the nose of the latch, and lift the same when the teeth have reached the desired point of elevation, and to aid, if need be, in forcing back the arm $i$, and, by oscillating the rock-shaft V, raising the arms W to disengage the dogs from the ratchets. From this construction it will be readily understood (referring particularly to Figs. 1, 2, and 3, the first two of which show the position of the parts when the teeth are down and at work gathering their load) that when the driver wishes to dump the rake he merely has to press his foot upon the chain, thereby drawing forward the arm $e$ and oscillating the rock-shaft V, which, as it rocks, throws out the arm $i$ until the notch in the latch engages it, and thereby holds the rock-shaft V locked. This turning of the rock-shaft V throws down the arms W, and permits the springs $d$ to project the dogs U into engagement with the ratchets P, whereupon the casings Q become locked to the wheels and begin to rotate therewith, which motion is imparted to the rod K through the medium of the links S and arms T. As the arm N, near the middle of the rake-head, is keyed to the rod K, the power of the wheels is imparted to the rake-head at or near its middle, and the latter is rocked forward as the rod K is oscillated, and the teeth are elevated to discharge the gathered load. When the teeth have reached the desired point of elevation, the roller $l$ comes in contact with and lifts the latch $j$, thereby freeing the arm $i$ and releasing the rock-shaft V, which, through the retraction of the spring $g$, acting upon the arm $e$, is turned to raise the arms W, which come in contact with the studs $b$ and lift the dogs U out of engagement with the ratchets, whereupon the gravity of the parts restores the rocking frame and the teeth to working position. In case the spring $g$ should prove insufficient to turn back the rock-shaft V and effect the disengagement of the dogs, the roller $l$ would at this moment come in contact with the arm $i$, and, forcing it back, would thus exert the tilting force of the rake-head directly upon the rock-shaft V, to cause the raising of the arms W and disengagement of the pawls. Should, however, both these forces be insufficient to break the lock between the dogs and the ratchets, I provide inclined or cam surfaces $m$ upon the arms W, against which the studs $b$ would strike, and by which they would be lifted, and the dogs at once forced out of engagement with the ratchets. It will be noticed that any suitable stops, $n$, projecting from the axle A under the arms W limit their downward motion, which stops are so arranged as to prevent the arm $e$ from being drawn forward farther than necessary to permit the engagement of the arm $i$ and latch $j$. It will, also, be seen from this construction that the rake can be dumped while in the act of turning in either direction by that wheel which is traveling faster, the dog at the other wheel merely clicking over the ratchets and not being engaged thereby. If desired, the arms $i$ and $e$ may be combined to form one piece, as will be readily understood. Where it is not desired to exert the dumping power at or near the middle of the rake-head, the arm N need not be keyed to the rod K, and the crank-arms T in that event would be dispensed with, the arms R of the casings Q being united to the arms J by the links S, as shown in Figs. 5, 6, 7, and 8, thereby uniting the rake-head at its ends directly to the casings Q.

Instead of the external ratchets, P, shown in Figs. 1, 2, 3, and 4, the wheel-hubs may have internal ratchets, P, as shown in Figs. 5, 6, 7, and 8, in which event the pawl or dog U shown in Fig. 6 is employed. This dog has its engaging-nose guided between lugs $o$, projecting from the plate of the casing Q, is slotted so as to encompass and form a bearing upon the wheel-spindle, and has at its rear end the projecting stud $b$, extending through a slot in the casing Q, to engage with the arms W in the same manner as and for the purpose before described. A spring or springs, $d$, would be employed, as in the former case, to throw the dogs U into engagement when the arms W were depressed by the oscillation of the rod V, as will be readily understood.

Having thus fully described my invention, I claim—

1. In a horse hay-rake, the combination, with the rake-teeth, the rake-head journaled upon the axle, and the carrying-wheels provided with ratchets revolving therewith, of pawl-carrying plates coincidently journaled with the carrying-wheels, and provided with pawls, and link mechanism uniting said pawl-carrying plates to the rake-head, whereby the engagement of the pawls and ratchets effects a lock between the carrying-wheels and rake-head, to cause the oscillation of the rake-head and the elevation of the teeth as the rake advances or turns.

2. In a horse hay-rake, the combination, with the rake-teeth, the rake-head journaled upon the axle, and the carrying-wheels provided with ratchets revolving therewith, of pawl-carrying plates coincidently journaled with the carrying-wheels, and provided with pawls, and link mechanism uniting said pawl-carrying plates to the rake-head at or near its middle, whereby the engagement of the pawls and ratchets effects a lock between the carrying-wheels and rake-head to cause the oscillation of the rake-head and elevation of the teeth as the rake advances or turns, and whereby the power of the carrying-wheels is exerted at or near the middle of the rake-head.

3. In a horse hay-rake, the combination, with the rake-teeth, the rake-head, and the carrying-wheels provided with ratchets revolving therewith, of pawl-carrying plates coincidently journaled with the carrying-wheels, and provided with spring-projected pawls, link mechanism uniting said pawl-carrying plates to the rake-head, arms for supporting said pawls out of engagement with the ratchets, and connecting mechanism, which, at the will of the operator, causes the depression of the supporting-arms and the consequent engagement of the pawls with the ratchets to effect a lock between the carrying-wheels and the rake-head, for the purpose described.

4. In a horse hay-rake, the combination, with the rake-teeth, the rake-head, and the carrying-wheels provided with ratchets revolving therewith, of pawl-carrying plates coincidently journaled with the carrying-wheels, and provided with spring-projected pawls, link mechanism uniting said pawl-carrying plates to the rake-head, arms for supporting said pawls out of engagement with the ratchets, a rock-shaft carrying said supporting-arms, and means for oscillating said rock-shaft at the will of the operator to depress the supporting-arms and permit the engagement of the pawls with the ratchets, to effect a lock between the carrying-wheels and the rake-head.

5. In a horse hay-rake, the combination, with the rake-teeth, the rake-head, and the carrying-wheels provided with ratchets revolving therewith, of pawl-carrying plates coincidently journaled with the carrying-wheels, and provided with spring-projected pawls, link mechanism uniting said pawl-carrying plates to the rake-head, arms for supporting said pawls out of engagement with the ratchets, a rock-shaft carrying said supporting-arms, means for oscillating said rock-shaft at the will of the operator to depress the supporting-arms and permit the engagement of the pawls with the ratchets to effect a lock between the carrying-wheels and the rake-head, a latch and arm for locking said supporting-arms in a depressed position, and a projection upon the rake-head for releasing the latch and arm, and causing the re-engagement of the supporting-arms and pawls to disengage the latter from the ratchets when the rake-teeth have been sufficiently elevated to discharge their load.

6. In a horse hay-rake substantially such as described, the combination, with the ratchets revolving with the carrying-wheels, of combined pawl-carrying plates, and shields encompassing said ratchets, and having contained therein pivoted pawls adapted to engage with the ratchets, and link mechanism uniting said pawl-carrying plates to the rake-head, substantially as and for the purpose specified.

7. The combination, with the ratchets P, pawl-carrying plates Q, and pawls U, provided with lateral studs $b$, of the arms W, having cam or inclined surfaces $m$, and link mechanism uniting the pawl-carrying plates to the rake-head, substantially as and for the purpose specified.

E. FOWLER STODDARD.

Witnesses:
H. A. CRANDALL,
W. W. WAGNER.